United States Patent
Kiiskila et al.

(10) Patent No.: US 9,783,279 B2
(45) Date of Patent: Oct. 10, 2017

(54) COOLING ARRANGEMENT FOR A PROPULSION UNIT

(71) Applicant: ABB Oy, Helsinki (FI)

(72) Inventors: Jussi Kiiskila, Helsinki (FI); Ville Kortelainen, Helsinki (FI); Mirva Nevalainen, Helsinki (FI); Tero Tamminen, Helsinki (FI)

(73) Assignee: ABB Oy, Helsinki (FI)

( * ) Notice: Subject to any disclaimer, the term of this patent is extended or adjusted under 35 U.S.C. 154(b) by 358 days.

(21) Appl. No.: 14/711,516

(22) Filed: May 13, 2015

(65) Prior Publication Data

US 2015/0329191 A1     Nov. 19, 2015

(30) Foreign Application Priority Data

May 13, 2014 (EP) .................................... 14168084

(51) Int. Cl.
    *B63H 5/125*     (2006.01)
    *B63J 2/12*     (2006.01)
    (Continued)

(52) U.S. Cl.
    CPC ................ *B63J 2/12* (2013.01); *B63H 5/125* (2013.01); *F04D 29/588* (2013.01);
    (Continued)

(58) Field of Classification Search
    CPC .... B63H 5/125; B63H 5/1252; B63H 5/1254; B63H 5/1256; B63H 5/1258; F16C 37/00; F16C 37/007
    See application file for complete search history.

(56) References Cited

U.S. PATENT DOCUMENTS 5,403,216 A    4/1995    Salmi et al.
6,783,409 B2 *   8/2004    Lonngren .............. B63H 5/125
                                                  440/58
(Continued)

FOREIGN PATENT DOCUMENTS

EP          0 590 867 A1     4/1994
WO       WO 01/81170 A1    11/2001

OTHER PUBLICATIONS

European Search Repor for EP 14 16 8084 dated Nov. 4, 2014.

*Primary Examiner* — Andrew Polay
(74) *Attorney, Agent, or Firm* — Taft Stettinius & Hollister LLP (57) ABSTRACT

A propulsion unit is disclosed with a hollow strut having an upper portion with an upper end portion passing through a passage (P1) formed between a first outer bottom and a second inner bottom in a vessel. The upper end portion is rotatably supported with a slewing bearing and sealed with a slewing seal towards the vessel. A cooling arrangement includes a cooling air duct system, at least one fan and at least one cooling unit. The slewing seal can include an upper slewing seal and a lower slewing seal at a vertical distance (H1) from each other with a space formed between the slewing seals. The upper end portion has openings (O1) into the space between the slewing seals. A first cooling air duct is directed to this space, whereby cooling air (L1) can be circulated through the first cooling air duct (400) into the space and through the openings (O1) in the upper end portion to the interior of the strut, or return air (L2) can be circulated from the strut in an opposite direction.

17 Claims, 7 Drawing Sheets

(51) Int. Cl.
*H02K 9/10* (2006.01)
*F04D 29/58* (2006.01)
*F16C 37/00* (2006.01)

(52) U.S. Cl.
CPC ............ *F16C 37/007* (2013.01); *H02K 9/10* (2013.01); *B63H 2005/1254* (2013.01); *B63H 2005/1258* (2013.01)

(56) References Cited

U.S. PATENT DOCUMENTS

| | | |
|---|---|---|
| 6,935,907 B2 | 8/2005 | Lönngren |
| 9,541,137 B2 * | 1/2017 | Mori ........................ F16C 33/76 |
| 2017/0081007 A1 * | 3/2017 | Kosso ........................ B63J 2/12 |
| 2017/0158298 A1 * | 6/2017 | Lobell .................... B63H 5/125 |

* cited by examiner

COOLING ARRANGEMENT FOR A PROPULSION UNIT

RELATED APPLICATION

This application claims priority under 35 U.S.C. §119 to European Patent Application No. 14168084.3 filed in Europe on 13 May 2014, the entire content of which is hereby incorporated by reference in its entirety.

FIELD

The present disclosure relates to a cooling arrangement for a propulsion unit.

BACKGROUND INFORMATION

U.S. Pat. No. 6,783,409 discloses a pod unit including a housing and an assembly unit, a so called seating, for the pod housing. The housing includes a lower casing portion incorporating the propulsion unit, an intermediate portion comprising air ducts, and an upper portion being fixedly connected to a steering engine with a gear ring being fixed at the base. The seating has a lower portion and an upper portion as well as a base for the installation of the pod housing. The lower portion of the seating is positioned on the first outer bottom of the vessel and the upper portion of the seating is positioned at the level of the second inner bottom of the vessel. The base is positioned at the lower portion of the seating.

A cooling system having at least one fan is mounted within the seating. The cooling air is directed downwards through an inlet duct in the middle of the seating passing down to the lower portion of the pod housing. Hot air returns from the lower portion of the pod housing via a return duct surrounding the inlet duct. The hot air is directed from the return duct to a cooling unit within the seating and then again back to the inlet duct. Cooling air is thus circulated with one or two fans between the cooling unit in the seating and the lower portion of the pod housing.

U.S. Pat. No. 6,935,907 is a continuation of the above mentioned U.S. Pat. No. 6,783,409 and discloses a similar assembly unit as is disclosed in U.S. Pat. No. 6,935,907.

EP patent publication 0 590 867 discloses a ship propulsion arrangement having a tubular shaft rotatable about a vertical axis and an outer casing at the lower end of the shaft. An electric motor within the outer casing is connected with a shaft to a propeller outside the outer casing. There are webs arranged within the outer casing forming structural elements of the casing. The webs stiffen and support the outer casing, secure the electric motor in place, and form ducts for cooling air directed to the electric motor and for return air directed from the electric motor.

Another known propulsion unit includes a hollow strut having an upper portion and a lower portion. An upper end portion of the upper portion passes through a passage formed between a first outer bottom and a second inner bottom in a vessel. The upper end portion is rotatably supported at a hull of the vessel with a slewing bearing and sealed against the hull of the vessel with a slewing seal. An electric motor is positioned in the lower portion of the hollow strut and a propeller positioned outside the strut is connected to the electric motor. A generator connected to a combustion engine is positioned within the vessel. The generator produces electric energy to the electric motor in the lower portion of the strut. The electric energy is transferred via a slip ring unit from the interior of the vessel to the electric motor in the lower portion of the strut.

The cooling of the electric motor in the lower portion of the strut is done by circulating cooling air from within the interior of the vessel to the electric motor. Cooling air is circulated from the interior of the vessel with a fan to the upper end portion of the upper portion of the strut and further down via the strut to the electric motor and hot air is directed up again via the strut to the cooling unit positioned inside the vessel. The cooling air passing down via the strut to the electric motor is separated from the hot air passing up via the strut by walls forming vertical air ducts within the strut.

The cooling air duct leading cooling air from the cooling unit to the upper end portion of the strut and the return air duct leading hot air from the upper end portion of the strut back to the cooling unit are, in known arrangements, positioned above the slewing bearing. This known cooling arrangement leads to a rather extensive construction. A part of the slewing bearing in this known arrangement is subjected to warm internal air in the interior of the vessel and another part of the slewing bearing is subjected to cold air propagating along the steel structures from the sea. The temperature difference within the slewing bearing creates thermal stresses in the slewing bearing. The thermal stresses can shorten the lifetime of the slewing bearing.

SUMMARY

A cooling arrangement is disclosed which is configured for a propulsion unit, which propulsion unit includes a hollow strut having an upper portion and a lower portion, an upper end portion of the upper portion passing through a passage (P1) formed between a first outer bottom and a second inner bottom in a vessel, the upper end portion being rotatable around an axis (Y-Y) of rotation, supported at a hull of the vessel with a slewing bearing, and sealed against the hull of the vessel with a slewing seal positioned under the slewing bearing, a motor being positioned in the lower portion of the strut.

The cooling arrangement comprises: a cooling air duct system configured for directing cooling air (L1) to an interior of a strut and for directing return air (L2), which has been heated in a motor back from the interior of the strut; at least one fan for circulating the cooling air (L1); at least one cooling unit for cooling the return air (L2); a slewing seal having an upper slewing seal and a lower slewing seal positioned at a vertical distance (H1) from each other, whereby a space is formed between the upper slewing seal and the lower slewing seal; an upper end portion of an upper end of a strut wherein openings (O1) pass through a side wall of the upper end portion along a circumference of the side wall of the upper end portion in the space between the upper slewing seal and the lower slewing seal; and a first cooling air duct of the cooling air duct system which is directed to the space between the upper slewing seal and the lower slewing seal for circulating cooling air (L1) through the first cooling air duct into the space between the upper slewing seal and the lower slewing seal, and through the openings (O1) in the upper end portion to an interior of the strut, or for circulating return air (L2) from the strut in an opposite direction.

BRIEF DESCRIPTION OF THE DRAWINGS

In the following discussion, exemplary aspects of the invention will be described in greater detail by way of exemplary preferred embodiments with reference to the attached drawings, in which.

DETAILED DESCRIPTION

The present disclosure describes embodiments which can achieve an improved cooling arrangement for a propulsion unit.

An exemplary propulsion unit includes a hollow strut having an upper portion and a lower portion, an upper end portion of the upper portion passing through a passage formed between a first outer bottom and a second inner bottom in a vessel, the upper end portion being rotatable around an axis of rotation, supported at a hull of the vessel with a slewing bearing and sealed against the hull of the vessel with a slewing seal positioned under the slewing bearing, a motor being positioned in the lower portion of the strut.

An exemplary cooling arrangement can include a cooling air duct system for directing cooling air to the interior of the strut and for directing return air which has been heated in the motor back from the interior of the strut, at least one fan for circulating the cooling air, and at least one cooling unit for cooling the return air.

The cooling arrangement can be configured such that:

the slewing seal includes an upper slewing seal and a lower slewing seal which are positioned at a vertical distance from each other, whereby a space is formed between the upper slewing seal and the lower slewing seal;

the upper end portion can include openings passing through a side wall of the upper end portion along the circumference of the side wall of the upper end portion in the space between the upper slewing seal and the lower slewing seal, a first cooling air duct is directed to the space between the upper slewing seal and the lower slewing seal, whereby cooling air can be circulated through the first cooling air duct into the space between the upper slewing seal and the lower slewing seal and further through the openings in the upper end portion to the interior of the strut or return air can be circulated from the strut in the opposite direction.

An exemplary benefit of such a configuration is a reduced height of the cooling arrangement above the second inner bottom of the vessel. This is due to the fact that the first cooling air duct can be positioned on a lower level compared to known solutions. The first cooling air duct is for example positioned below the slewing bearing in an exemplary arrangement. Only the second cooling air duct is positioned above the slewing bearing.

Another exemplary benefit is that the outer circumference and the inner circumference of the slewing bearing will be surrounded with cooling air. The whole slewing bearing will thus operate in a constant temperature. This will considerably reduce thermal stresses, which are caused by uneven temperatures within the slewing bearing. The thermal behaviour of the slewing bearing is thus more uniform in exemplary disclosed arrangements. This may prolong the lifetime of the slewing bearing.

It is also possible to arrange easy access to the slewing seal in this arrangement. Easy access to the slewing seal enables easier inspection of the slewing seal. Easy access and easy change of the slewing seal means reduced service costs.

The hull of the vessel as referenced herein means the watertight outer body of the vessel.

Figure 1:
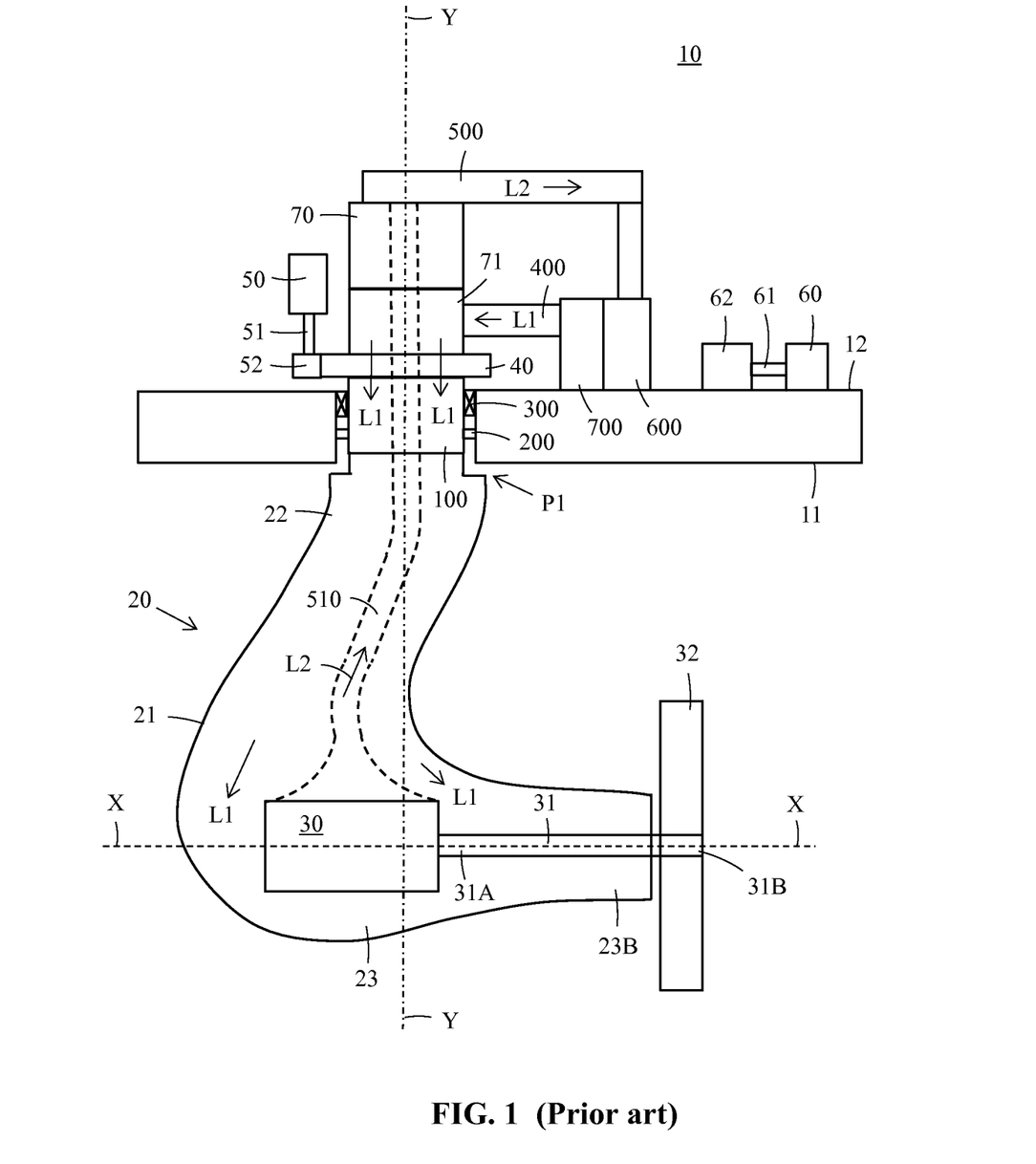
FIG. 1 shows a vertical cross section of an exemplary propulsion unit in a vessel.

FIG. 1 shows a vertical cross section of an exemplary propulsion unit in a vessel. The vessel 10 has a double bottom; i.e., a first outer bottom 11 forming the hull of the vessel and a second inner bottom 12. The propulsion 20 unit includes a hollow strut 21 with an upper portion 22 and a lower portion 23. The upper portion 22 of the strut 21 forms a support arm supporting the lower portion 23 of the strut. The lower portion 23 of the strut 21 forms a longitudinal compartment having a driving unit 30, 31, 32. The driving unit can include in this embodiment a first electric motor 30, a first shaft 31 and a propeller 32 positioned outside the lower portion 23 of the strut 21. A first end 31A of the first shaft 31 is connected to the first electric motor 30 and a second end 31B of the first shaft 31 protrudes from an aft end 23B of the lower portion 23 of the strut 21. The propeller 32 is connected to the second outer end 31B of the first shaft 31. The axial centre line X-X of the first shaft 31 forms a shaft line.

The propulsion unit 20 is rotatably attached to the vessel 10 via the upper portion 22 of the strut 21 so that it can turn 360 degrees around a centre axis Y-Y of rotation. A passage P1 is formed from the first outer bottom 11 to the second inner bottom 12 of the vessel 10. The upper portion 22 of the strut 21 of the propulsion unit 20 is connected to an upper block 100. The upper block 100 passes through the passage P1 and is rotatably attached with a slewing bearing 300 to the hull of the vessel 10. The upper block 100 has, for example, a generally cylindrical from. The upper block 100 could, instead of being a separate part, be formed by an upper end portion of the upper portion 22 of the strut 21. A slewing seal 200 positioned under the slewing bearing 300 forms the seal between sea water and the interior of the hull of the vessel 10. A gearwheel 40 is further attached to the upper end portion of the upper block 100.

The gearwheel 40 can be turned 360 degrees around the centre axis Y-Y of rotation with a second electric motor 50. The second electric motor 50 drives a pinion wheel 52 through a second shaft 51. The cogs of the pinion wheel 52 are connected to the cogs of the gearwheel 40. There can naturally be several similar second electric motors 50 connected to the gearwheel 40. The turning of the gearwheel 40 will turn the propulsion unit 20. The gearwheel 40 has a ring form with a hole in the middle. The cogs of the gearwheel 40 are in this embodiment positioned on the outer edge of the gearwheel 40. Another possibility is to have the cogs on the inner edge of the gearwheel 40. Instead of one or several second electric motors 50, one or more hydraulic motors can be used.

There is further an engine 60 within the vessel 10 and a generator 62 connected with a third shaft 61 to the engine 60. The engine 60 can be a known combustion engine used in vessels 10. The generator 62 produces electric energy needed in the vessel 10 and the propulsion unit 20. There can be several combustion engines 60 and generators 62 in a vessel 10.

There is further an outer foundation 71 above the gear wheel 40 and a slip ring arrangement 70 above the outer foundation 71. Electric power is transferred from the generator 62 to the slip ring arrangement 70 with a cable (not shown in the figure). Electric power is further transferred from the slip ring arrangement 70 to the first electric motor 30 with a cable (not shown in the figure). The slip ring arrangement 70 is included to transfer electric power between the stationary hull 10 of the vessel and the rotating propulsion unit 20.

FIG. 1 shows also a known cooling arrangement for the propulsion unit 20. The cooling arrangement includes a fan 600 and a cooling unit 700 positioned on the second inner bottom 12 of the vessel as well as a cooling air duct system 400, 500, 510. There is a first cooling air duct 400 leading radially from the cooling unit 700 to the side surface of the outer foundation 71 of the propulsion unit 20. There is a second cooling air duct 500 leading radially from a point above the slip ring arrangement 70 to the fan 600 and the cooling unit 700. There is a third cooling air duct 510 leading from the electric motor 30 up through a middle portion of the strut 21. The third cooling air duct 510 passes through the upper block 100, through the opening in the middle of the gear wheel 40, through the outer foundation 71, and further through the slip ring arrangement 70 to a point above the slip ring arrangement 70. The second cooling air duct 500 is connected to the third cooling air duct 510 at a point above the slip ring arrangement 70.

Cooling air L1 is blown with the fan 600 through the cooling unit 700 and further with the first cooling air duct 400 to the outer foundation 71 and further through openings in the annular wall of the outer foundation 71 into the outer foundation 71 and further downwards through the opening in the middle of the gear wheel 40 and further through the upper block 100 and further through the upper portion 22 of the strut 21 to the first electric motor 30 in the lower portion 23 of the strut 21.

Return air L2 is directed from the first electric motor 30 at the lower portion 23 of the strut 21 with the third cooling air duct 510 to a point above the slip ring arrangement 71 and further with the second cooling air duct 500 to the fan 600 and the cooling unit 700 in order to be reintroduced into the cooling air circulation.

The return air L2 flows upwards in the third cooling air duct 510 formed in the middle of the strut 21 and the cooling air L1 flows downwards in the space between the outer circumference of the third cooling air duct 510 and the inner circumference of the strut 21. The flow of the cooling air L1 and the flow of the return air L2 are thus separated during the rotation of the cooling air L1. The cooling air L1 is directed in the lower portion 23 of the strut 21 towards the ends of the first electric motor 30. The cooling air L1 passes into axial cooling air ducts within the rotor of the first electric motor 30 and further along radial cooling ducts in the rotor to the air gap between the rotor and the stator and further with radial cooling air ducts to the outer circumference of the stator. The heated cooling air L1 forming the return air L2 is then directed from the outer circumference of the stator to the third cooling air duct 510. There can naturally be several third cooling air ducts within the strut 21 as in EP 0 590 867.

The direction of the cooling air L1 could also be reversed; i.e., the fan 600 could blow in an opposite direction. The cooling air L1 could thus be directed into the strut 21 along the second cooling air duct 500. The return air L2 would be directed from the strut 21 along the first cooling air duct 400. The position of the fan 600 and the cooling unit 700 could be changed.

The cooling of the electric motor 30 could also be reversed. Air could be blown into the electric motor 30 from the middle portion and extracted from the end portions of the electric motor 30. Air could also be blown into the electric motor 30 only from one end of the electric motor 30 and extracted from the middle portion of the electric motor 30.

The fan 600 could also be positioned between two cooling units 700.

Figure 2:
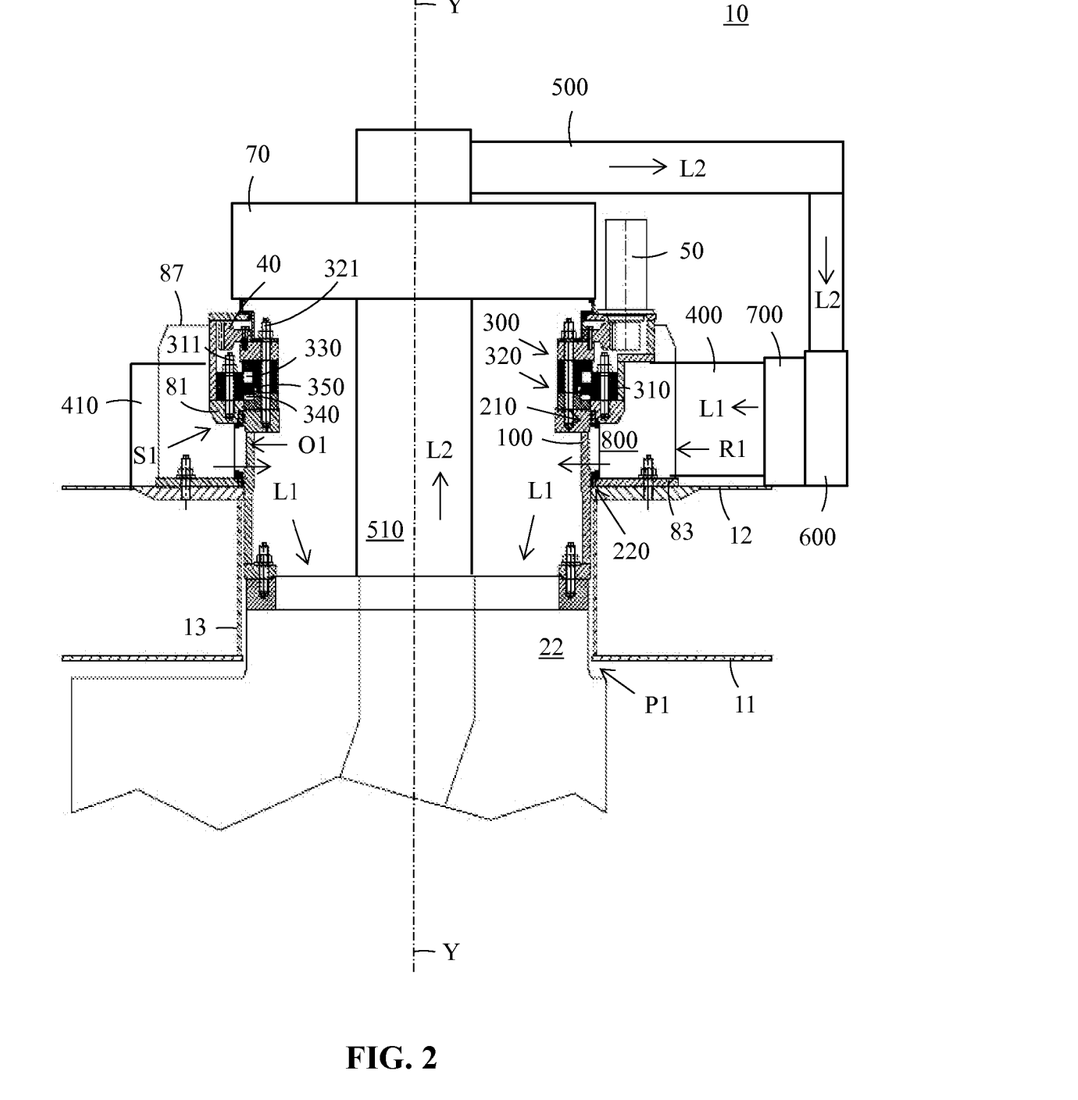
FIG. 2 shows a vertical cross section of a first exemplary embodiment of a cooling arrangement as disclosed herein.

FIG. 2 shows a vertical cross section of a first embodiment of a cooling arrangement according to the present disclosure. The upper portion 22 of the strut 21 is attached to the upper block 100. The upper block 100 extends above the second inner bottom 12 of the vessel 10 and is connected to the slewing bearing 300 above the second inner bottom 12 of the vessel. The slewing bearing 300 is supported with a support structure having radially and vertically extending support flanges 87 on the inner bottom 12 of the vessel 10. The support flanges 87 are positioned at an angular distance from each other around the slewing bearing 300. The slewing bearing 300 includes a first bearing block 310 and a second bearing block 320, first roller means 330, second roller means 340 and third roller means 350. The lower surface S1 of the slewing bearing 300 is positioned above the second inner bottom 12 of vessel 10. The slewing seal 200 is positioned below the slewing bearing 300 and includes an upper slewing seal 210 and a lower slewing seal 220. A first support wall 13 extends vertically between the first outer bottom 11 and the second inner bottom 12 of the vessel 10. The first support wall 13 is for example circular and closes the space between the first outer bottom 11 and the first inner bottom 12 towards the passage P1 formed between the first outer bottom 11 and the second inner bottom 12 of the vessel 10.

The first bearing block 310 is for example a cylindrical part attached with vertically extending bolts 311 to a first support part 81. The first support part 81 has for example a generally cylindrical from. The support flanges 87 support the first support part 81 at a horizontally extending first support ring 83. The first support ring 83 is attached to the second inner bottom 12 of the vessel 10 for example by a threaded joint. The cross section of the first bearing block 310 can have essentially the form of a 90 degrees tilted letter T.

The second bearing block 320 is for example a cylindrical part having an upper part and a lower part. The second bearing block 320 is attached with vertically extending bolts 321 through the upper part and the lower part to the upper end portion of the upper block 100. The upper end portion 22 of the strut 21 of the propulsion unit 20 is attached to the lower end of the upper block 100. The cross section of the second bearing block 320 has essentially the form of a letter C.

The first roller means 330 is positioned in a raceway between the first bearing block 310 and the second bearing block 320 so that the downwards directed forces caused e.g. by the weight of the propulsion unit 20 are transferred from the second bearing block 320 through the first roller means 330 to the first bearing block 310 and further to the hull of the vessel 10.

The second roller means 340 is positioned in a raceway between the first bearing block 310 and the second bearing block 320 so that the upwards directed forces are transferred from the second bearing block 320 through the second roller means 340 to the first bearing block 310 and further to the hull of the vessel 10.

The third roller means 350 is positioned in a raceway between the first bearing block 310 and the second bearing block 320 so that the radial forces are transferred from the second bearing block 320 through the third roller means 350 to the first bearing block 310 and further to the hull of the vessel 10.

The gearwheel 40 rests on the second bearing block 320 and is attached with vertically extending bolts 321 to the upper portion of the upper block 100. The vertically extending bolts 321 extend also through the second bearing block 320. The rotation of the gearwheel 40 rotates the upper block 100 and the propulsion unit 20 around the centre axis Y-Y.

An exemplary cooling arrangement includes a fan 600 and a cooling unit 700 positioned on the second inner bottom 12 of the vessel 10 as well as a cooling air duct system 400, 410, 500, 510. A difference in this cooling arrangement compared to the cooling arrangement shown in FIG. 1 is in the position of the first cooling air duct 400. The first cooling air duct 400 is in this cooling arrangement leading from the cooling unit 700 to the space 800 between the upper slewing seal 210 and the lower slewing seal 220 in the upper block 100. The first cooling air duct 400 can include an annular portion 410 surrounding the space 800 between the upper slewing seal 210 and the lower slewing seal 220. The second cooling air duct 500 still leads from a point above the slip ring unit 70 to the fan 600 and the cooling unit 700. The third cooling air duct 510 also leads from the electric motor 30 up through a middle portion of the strut 21. The third cooling air duct 510 passes through the upper block 100, through the opening in the middle of the gear wheel 40, and further through the slip ring arrangement 70 to a point above the slip ring arrangement 70. The second cooling air duct 500 is connected to the third cooling air duct 510 at a point above the slip ring arrangement 70.

Cooling air L1 is blown with the fan 600 through the cooling unit 700 along the first cooling air duct 400 in the radial direction R1 to the annular portion 410 and thereby to the space 800 between the upper slewing seal 210 and the lower slewing seal 220. There are openings O1 passing in the radial direction R1 through the outer cylindrical wall of the upper block 100 in the space 800 between the upper slewing seal 210 and the lower slewing seal 220. The cooling air L1 will thus pass through these openings O1 into the interior of the upper block 100. The cooling air L1 will then be directed downwards through the upper block 100 and further through the upper portion 22 of the strut 21 to the first electric motor 30 in the lower portion 23 of the strut 21.

Return air L2 is directed from the first electric motor 30 at the lower portion 23 of the strut 21 with the third cooling air duct 510 to a point above the slip ring arrangement 71 and further with the second cooling air duct 500 to the fan 600 and the cooling unit 700 in order to be reintroduced into the cooling air circulation.

The return air L2 flows upwards in the third cooling air duct 510 formed in the middle of the strut 21 and the cooling air L1 flows downwards in the space between the outer circumference of the third cooling air duct 510 and the inner circumference of the strut 21. The flow of the cooling air L1 and the flow of the return air L2 are thus separated during the rotation of the cooling air L1. The cooling air L1 is directed in the lower portion 23 of the strut 21 towards the ends of the first electric motor 30. The cooling air L1 passes into axial cooling air ducts within the rotor of the first electric motor 30 and further along radial cooling ducts in the rotor to the air gap between the rotor and the stator and further with radial cooling air ducts to the outer circumference of the stator. The heated cooling air L1 forming the return air L2 is then directed from the outer circumference of the stator to the third cooling air duct 510.

Figure 4:
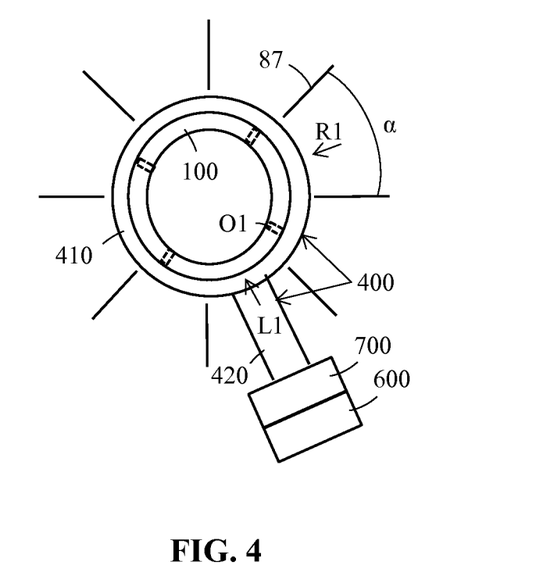
FIG. 4 shows a horizontal cross section of FIG. 2 showing a first exemplary version of a cooling arrangement as disclosed herein.
Figure 5:
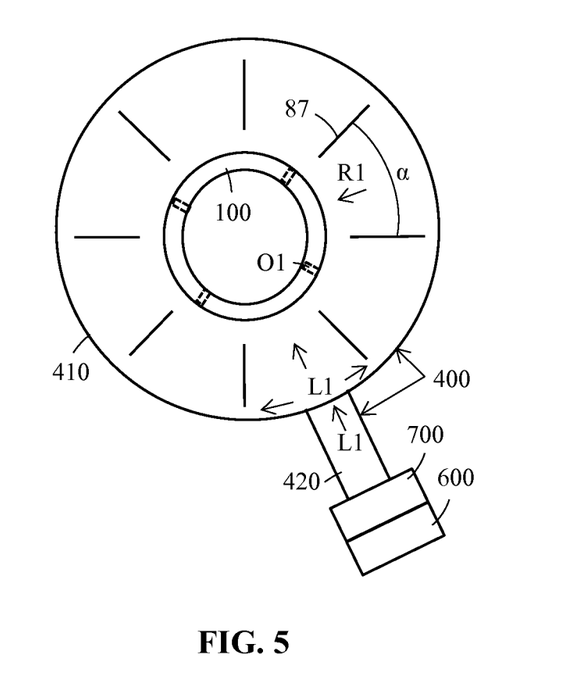
FIG. 5 shows a horizontal cross section of FIG. 2 showing a second version of an exemplary cooling arrangement as disclosed herein.

An exemplary arrangement of the first cooling air duct 400 leading to the space 800 between the upper slewing seal 210 and the lower slewing seal 220 is explained more in detail in connection with FIGS. 4 and 5.

Figure 3:
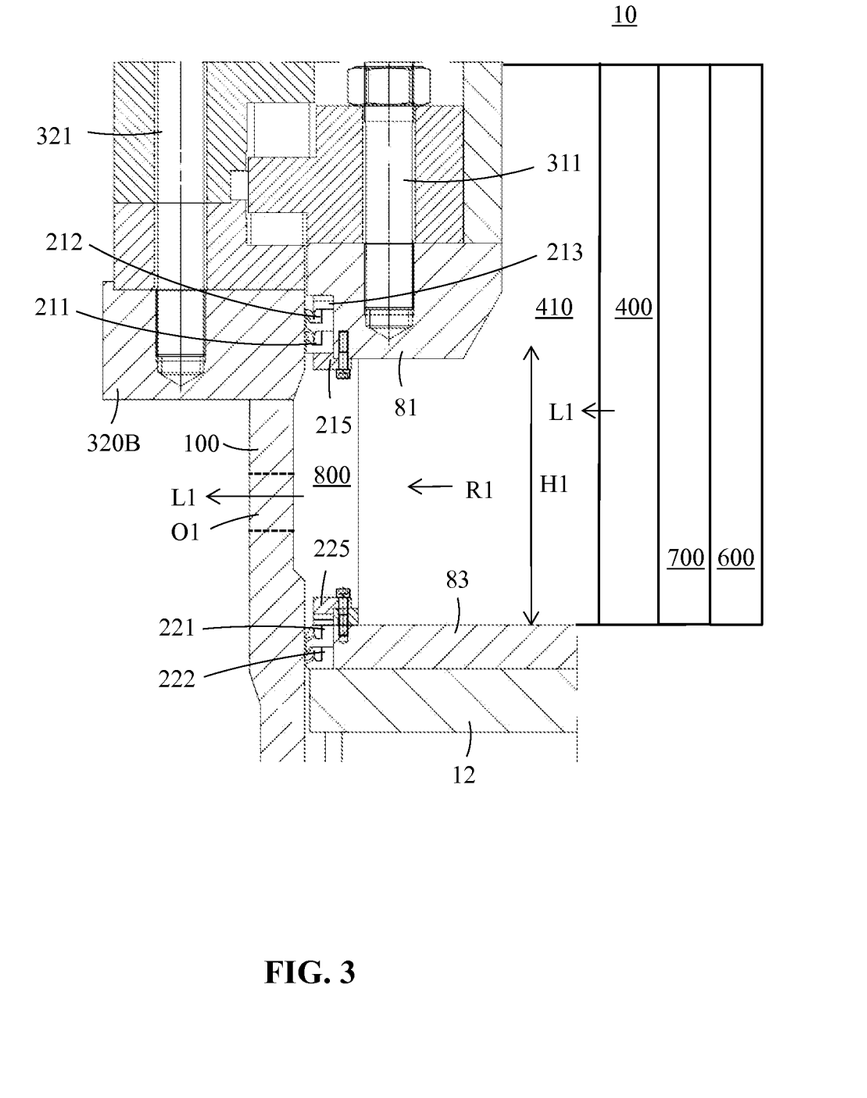
FIG. 3 shows a vertical cross section of an enlargement of a portion of FIG. 2.

FIG. 3 shows a vertical cross section of an enlargement of a portion of FIG. 2. The figure shows the right hand portion of FIG. 2 at the point where cooling air L1 is introduced to the upper block 100.

The upper slewing seal 210 can include two seal rings 211, 212 and an end ring 213. Each seal ring 211, 212 is composed of a base part and a lip part. The lip part forms the sealing against the rotating upper block 100. The upper slewing seal 210 is seated in a recess formed in the first support part 81. There is further a bracket 215 securing the upper slewing seal 210 into the recess. The bracket 215 can be attached e.g. with a bolt to the lower surface of the first support part 81. The upper slewing seal 210 can be changed by removing the bracket 215 and pulling the parts of the upper slewing seal 210 downwards out from the recess.

The lower slewing seal 220 can include two seal rings 221, 222. Each seal ring 221, 222 is composed of a base part and a lip part. The lip part forms the sealing against the rotating upper block 100. The lower slewing seal 220 is seated in a recess formed in connection with the inner edge of the first support ring 83. There is further a bracket 225 securing the lower slewing seal 210 into the recess. The bracket 225 can be attached e.g. with a bolt to the upper surface of the first support ring 83. The lower slewing seal 220 can be changed by removing the bracket 225 and pulling the parts of the lower slewing seal 220 upwards out from the recess.

The upper slewing seal 210 and the lower slewing seal 220 may be provided with lubrication if needed or desired. This can be arranged in any prior way known by those skilled in the art. Lubrication may be needed or desired in order to prevent dry running, overheating and premature wear of the lip parts of the seal rings 211, 212, 221, 222.

This is an exemplary embodiment of a slewing seal 200 construction that can be used in the arrangement. The upper slewing seal 210 and the lower slewing seal 220 can, for example, include any number of seal rings, any number of intermediate rings and any number of end rings, possible emergency seal rings etc. The position of the different parts within a slewing seal 210, 220 can be arbitrarily selected. Intermediate rings are not necessarily needed at all. The upper slewing seal 210 and the lower slewing seal 220 can include at least one seal ring.

The seal rings 211, 212, 221, 222 in the upper slewing seal 210 and in the lower slewing seal 220 are, for example, of an elastic material; e.g., rubber.

The upper slewing seal 210 and the lower slewing seal 220 are positioned at a vertical distance H1 from each other. A space 800 is thus formed between the upper slewing seal 210 and the lower slewing seal 220. There is also access provided to this space 800 in a radial direction R1 from the interior of the hull of the vessel 10. The access is through the passages formed between the radially and vertically extending support flanges 87. It is possible to service the upper slewing seal 210 and the lower slewing seal 220 via this space 800.

The cooling air L1 is directed with the fan 600 through the cooling unit 700 and the radial cooling air duct 400 to the annular portion 410 and thereby to the space 800 between the upper slewing seal 210 and the lower slewing seal 220. The upper wall of the annular portion 410 can be positioned at such a height that the cooling air L1 will also be directed to the outer circumference of the slewing bearing 300 as is seen in FIG. 2. The cooling air L1 will also penetrate into the space within the inner circumference of the slewing bearing 300. This means that the slewing bearing 300 will be cooled by the cooling air L1 and kept under a constant temperature determined by the temperature of the cooling air L1. The uniform temperature of the slewing bearing will prevent thermal stresses due to an uneven temperature in the slewing bearing 300.

FIG. 4 shows a horizontal cross section of FIG. 2 showing a first version of a cooling arrangement according to an exemplary embodiment. The horizontal cross section is from a level between the upper slewing seal 210 and the lower slewing seal 220. The figure shows the radially and vertically extending support flanges 87 between the first support part 81 and the first support ring 83. The inner ends of the support flanges 87 are positioned at a radial distance from the rotating upper block 100. The support flanges 87 are positioned at an angular distance a from each other. There has to be enough space between two adjacent support flanges 87 so that access to the space 800 between the upper slewing seal 210 and the lower slewing seal 220 is provided. The first cooling air duct 400 can include a radial portion 420 positioned between the support flanges 87 and an annular portion 410 surrounding the rotating upper block 100 and opening to the space 800 between the upper slewing seal 210 and the lower slewing seal 220. The fan 600 blows cooling air L1 through the cooling unit 700 and through the radial portion 420 to the annular portion 410 and further through the openings O1 in the upper block 100 into the upper block 100. The figure shows only four openings O1 along the circumference of the upper block 100, but there can be any number of openings O1 distributed along the circumference of the upper block 100. The openings O1 can be positioned in several rows above each other and the openings O1 can form any pattern.

The annular portion 410 of the first cooling air duct 400 need not be circular. It could be e.g. polygonal. There can naturally be two or more radial portions 420 positioned in different spaces between the support flanges 87 leading to the annular portion 410.

FIG. 5 shows a horizontal cross section of FIG. 2 showing a second exemplary version of a cooling arrangement according to the present disclosure. The horizontal cross section is from the same level as the horizontal cross section shown in FIG. 4; i.e., between the upper slewing seal 210 and the lower slewing seal 220. A difference in this second version compared to the first version shown in FIG. 4 is the arrangement of the annular portion 410. The annular portion 410 is arranged outside the outer circumference of the support flanges 87. The fan 600 blows cooling air L1 through the cooling unit 700 and through the radial portion 420 to the annular portion 410 surrounding the support flanges 87. The annular portion 410 opens towards the spaces between the support flanges 87 and further towards the space 800 formed between the upper slewing seal 210 and the lower slewing seal 220. Cooling air L1 can thus be blown with the fan 600 through the cooling unit 700 and through the radial portion 420 to the annular portion 410 and further through the spaces between the support flanges 87 and further through the openings O1 in the upper block 100 into the upper block 100. The figure shows only four openings O1 along the circumference of the upper block 100, but there can be any number of openings O1 distributed along the circumference of the upper block 100. The openings O1 can be positioned in several rows above each other and the openings O1 can form any pattern.

The annular portion 410 of the first cooling air duct 400 need not be circular. It could be e.g. polygonal. There can naturally be two or more radial portions 420 leading to the annular portion 410.

Figure 6:
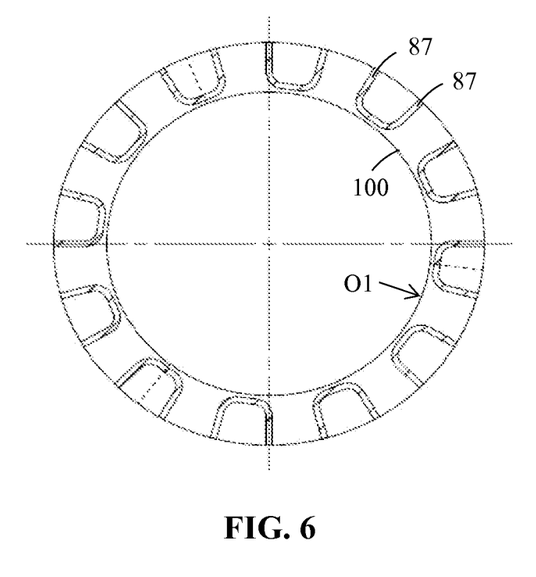
FIG. 6 shows a horizontal cross section of an exemplary alternative of FIG. 2.

FIG. 6 shows a horizontal cross section of an exemplary alternative of FIG. 2. This figure shows an alternative support arrangement between the slewing bearing 300 and the second inner bottom 11 of the vessel. The vertically and radially directed support flanges 87 are grouped into groups of two and the inner ends of each end are connected as shown in the figure. Access to the upper block 100 is still provided between two adjacent support flanges 87 that are not connected at their inner ends. The arrangement shown in FIG. 5 could e.g. be used for providing cooling to the openings O1 in the upper block 100. Each group of the two support flanges 87 have a U-shaped from as is seen in the figure.

Figure 7:
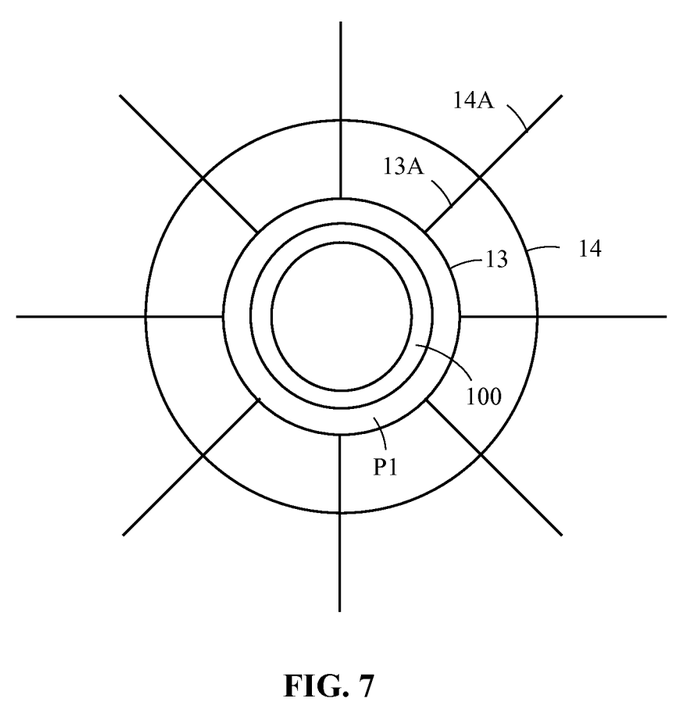
FIG. 7 shows another horizontal cross section of FIG. 2.

FIG. 7 shows another horizontal cross section of FIG. 2. The cross section is from the space between the first outer bottom 11 and the second inner bottom 12 in a vessel. The support construction between the first outer bottom 11 and the second inner bottom 12 includes radially extending support walls 13A, 14A and circularly extending support walls 13, 14. The circularly extending support walls 13, 14 could instead of circular be straight between the radial support walls 13A, 14A. The figure shows also the rotating upper block 100 and the passage P1 between the rotating upper block 100 and the stationary part 13. The space between the first outer bottom 11 and the second inner bottom 12 thus can include compartments formed within the radially extending support walls 13A, 14A and the circular support walls 13, 14. There can be openings between the compartments.

Figure 8:
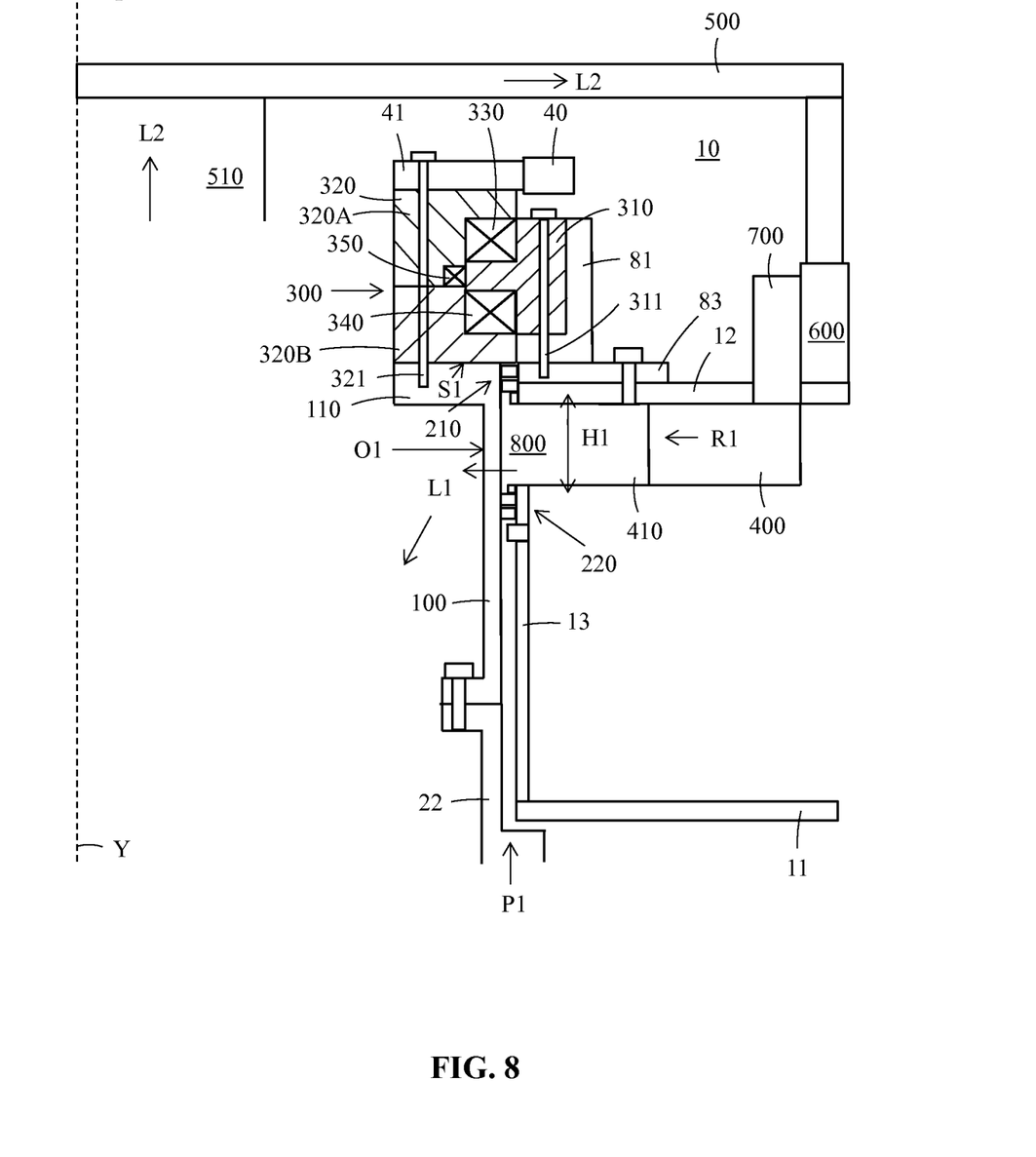
FIG. 8 shows a vertical cross section of another exemplary embodiment of a cooling arrangement as disclosed herein.

FIG. 8 shows a vertical cross section of a cooling arrangement according to a second exemplary embodiment disclosed herein. The cross section shows only the right half of the arrangement, which is symmetrical in view of the vertical centre axis Y-Y. The slewing bearing 300 is in this embodiment still positioned above the second inner bottom 12 of the vessel 10. The lower surface S1 of the slewing bearing 300 is positioned on the level of the first support ring 83, which is attached to the second inner surface 12 of the vessel 10. The slewing seal 200 is positioned below the second inner bottom 12 of the vessel 10 in the space between the first outer bottom 11 and the second inner bottom 12 of the vessel 10.

The first bearing block 310 is attached with vertically extending bolts 311 at the first support ring 83, which is attached to the second inner bottom 12 of the vessel 10.

The second bearing block 320 is a cylindrical part comprising an upper part 320A and a lower part 320B. The second bearing block 320 is attached with vertically through the upper part 320A and the lower part 320B extending bolts 321 to a cylindrical rotating second support part 110, which is formed of the upper portion of the upper block 100. The upper end portion 22 of the strut 21 of the propulsion unit 20 is attached to the lower end of the upper block 100.

An inner portion 41 of the gearwheel 40 rests on the second bearing block 320. The inner portion 41 of the gearwheel 40 is attached with vertically extending bolts 321 to the second support part 110. The vertically extending bolts 321 extend also through the second bearing block 320.

The rotation of the gearwheel 40 rotates the upper block 100 and the propulsion unit 20 around the centre axis Y-Y.

The construction of the slewing seal 200 can correspond to the construction of the slewing seal shown in FIG. 3. The upper slewing seal 210 is positioned in a recess formed in connection with the inner edge of the first support ring 83. The lower slewing seal 220 is positioned in a recess formed in connection with the upper end of the first support wall 13. The first support wall 13 is attached to the first outer bottom 11 and closes the space between the first outer bottom 11 and the lower slewing seal 220 towards the passage P1. There is a space 800 between the upper slewing seal 210 and the lower slewing seal 220 in the same way as in FIG. 2. The height H1 of the space 800 between the upper slewing seal 210 and the lower slewing seal 220 corresponds in this second embodiment to the height H1 in the first embodiment.

Access to the position of the slewing seal 200 below the second inner bottom 12 could be arranged by one or more maintenance hatches through the second inner bottom 12 and further maintenance hatches in the support walls in the space between the first outer bottom 11 and the second inner bottom 12.

The first support wall 13 extends vertically between the first outer bottom 11 and the lower slewing seal 220. The first support wall 13 closes the space between the first outer bottom 11 and the lower slewing seal 220 towards the passage P1 formed between the first outer bottom 11 and the lower slewing seal 220.

The cooling arrangement can include the fan 600 and the cooling unit 700 positioned on the second inner bottom 12 of the vessel as well as the cooling air duct system 400, 410, 500, 510. A difference in this cooling arrangement compared to the cooling arrangement shown in FIG. 2 is the position of the first cooling air duct 400.

The first cooling air duct 400 passes through the second inner bottom 12 and further to the annular portion 410 surrounding the space 800 between the upper slewing seal 210 and the lower slewing seal 220.

Cooling air L1 is blown with the fan 600 through the cooling unit 700 and through the first cooling air duct 400 to the annular portion 410 and further through the openings O1 in the side wall of the upper block 100 and further into the upper block 100. The return air L2 flows through the strut 21 via the third cooling air duct 510 in the middle of the strut 21 to the second cooling air duct 500 and further to the fan 600 and the cooling unit 700 in order to be reintroduced into the cooling air circulation. The cooling air L1 flows downwards in the space between the outer circumference of the third cooling air duct 510 and the inner circumference of the strut 21. The flow of the cooling air L1 and the flow of the return air L2 are thus separated during the rotation of the cooling air L1.

Figure 9:
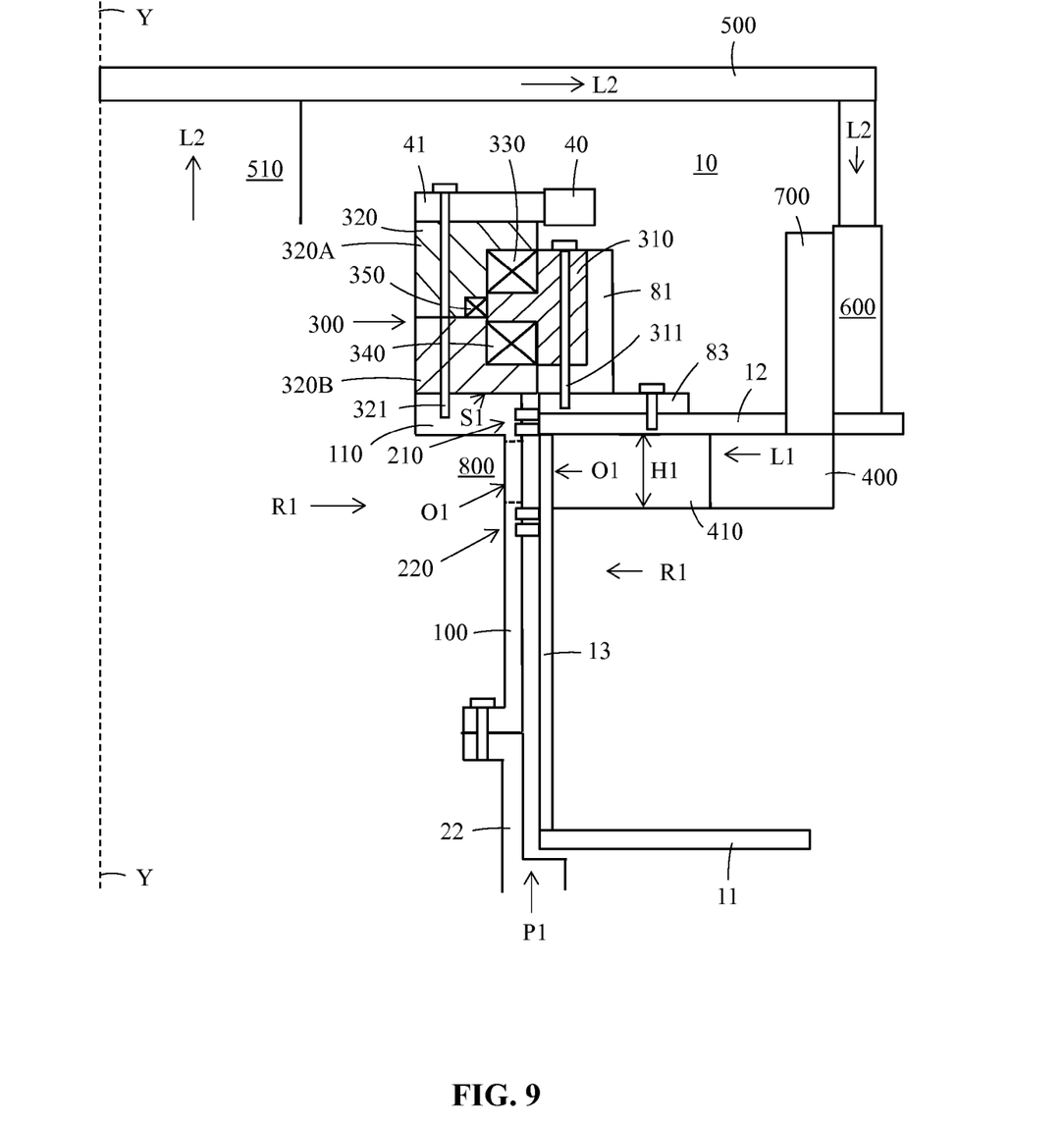
FIG. 9 shows a vertical cross section of a third exemplary embodiment disclosed herein.

FIG. 9 shows a vertical cross section of a third exemplary embodiment disclosed herein. The cross section shows only the right half of the arrangement, which is symmetrical in view of the vertical centre axis Y-Y. The slewing bearing 300 is also in this embodiment positioned above the second inner bottom 12 of the vessel 10. The slewing seal 200 is positioned between the first outer bottom 11 and the second inner bottom 12 of the vessel 10.

The slewing bearing 30 corresponds to the slewing bearing 300 in FIG. 8. Reference is thus made to FIG. 8 regarding the construction of the slewing bearing 300.

An inner portion 41 of the gearwheel 40 rests on the second bearing block 320. The inner portion 41 of the gearwheel 40 is attached with vertically extending bolts 321 to the second support part 110. The vertically extending bolts 321 extend also through the second bearing block 320. The rotation of the gearwheel 40 rotates the upper block 100 and the propulsion unit 20 around the centre axis Y-Y.

The upper slewing seal 210 is positioned immediately below the slewing bearing 300 in order to prevent leakage of lubrication medium from the slewing bearing 300. The upper slewing seal 210 can be supported on the first support wall 13 in which case the upper slewing seal 210 can be changed from the space between the first outer bottom 11 and the second inner bottom 12 of the vessel 10. The upper slewing seal 210 can on the other hand be supported on the upper block 100 in which case the upper slewing seal 210 can be changed from the interior of the upper block 100.

The lower slewing seal 220 is supported on the upper block 100 which means that the lower slewing seal 220 can be changed from the interior space of the upper block 100; i.e., from the interior of the strut 21.

The upper slewing seal 210 and the lower slewing seal 220 are positioned at a vertical distance H1 from each other. Access to the upper slewing seal 210 is provided in the radial direction R1 from the space between the first outer bottom 11 and the second inner bottom 11 of the vessel 10 or in the radial direction R1 from the space within the upper block 100. Access to the lower slewing seal 220 is provided in the radial direction R1 from the space within the upper block 100; i.e., from the interior of the strut 21.

The fan 600 and the cooling unit 700 are positioned on the second inner bottom 12 of the vessel. The first cooling air duct 400 passes through the second inner bottom 12 and further to the annular portion 410 and thereby to the space 800 between the upper slewing seal 210 and the lower slewing seal 220. Cooling air L1 is blown with the fan 600 through the first cooling air duct 400 and the annular portion 410 to the openings O1 in the side wall of the first support wall 13 and the side wall of the upper block 100 and further into the upper block 100. The return air L2 flows through the strut 21 via the third cooling air duct 510 in the middle of the strut 21 to the second cooling air duct 500 above the slip rings arrangement 70 and further to fan 600 and the cooling unit 700 in order to be reintroduced into the cooling air circulation. The cooling air L1 flows downwards in the space between the outer circumference of the third cooling air duct 510 and the inner circumference of the strut 21. The flow of the cooling air L1 and the flow of the return air L2 are thus separated during the rotation of the cooling air L1.

The direction of the cooling air L1 could be reversed in all embodiments in the disclosed cooling arrangements. The fan 600 would thus blow in an opposite direction. The cooling air L1 would thus be directed into the strut 21 along the second cooling air duct 500. The return air L2 would be directed from the strut 21 along the first cooling air duct 400. The position of the fan 600 and the cooling unit 700 could be changed.

The cooling of the electric motor 30 could also be arranged in any suitable way. The cooling could e.g. be reversed so that air would be blown into the electric motor 30 from the middle portion and extracted from the end portions of the electric motor 30. Air could also be blown into the electric motor 30 only from one end of the electric motor 30 and extracted from the middle portion of the electric motor 30.

The fan 600 could in all embodiments be positioned between two cooling units 700.

There are two seal rings in the upper slewing seal 210 and the lower slewing seal 220 in the different embodiments of the inventive arrangement shown in the figures. There could be any number of seal rings in the upper slewing seal 210 and the lower slewing seal 220. There should be at least one seal ring in the upper slewing seal 210 and one seal ring in the lower slewing seal 220.

The upper slewing seal 210 and the lower slewing seal 220 are for example at the same radial distance from the centre axis Y-Y of rotation. The upper slewing seal 210 and the lower slewing seal 220 may, however, also be positioned at different radial distances from the centre axis Y-Y of rotation.

In exemplary embodiments, the vertical distance H1 is at least 100 mm, advantageously at least 200 mm, and more advantageously at least 300 mm. The vertical distance H1 is measured between the lower surface of the lowermost seal ring 211 in the upper slewing seal 210 and the upper surface of the uppermost seal ring 221 in the lower slewing seal 220.

The support construction in the figures shows a separate upper block 100 attached to the upper end of the upper portion 22 of the strut 21 of the propulsion unit 20. The upper block 100 could, however, be formed as an integral upper end of the upper portion 22 of the strut 21.

The space 800 between the upper slewing bearing 210 and the lower slewing bearing 220 is for example an open space. Equipment for monitoring the condition of the slewing seal could be positioned in the space, but they would be easily demountable when the upper slewing seal 210 and the lower slewing seal 220 is to be changed.

The invention is not limited to the slewing bearing 300 shown in the figures. Any standard roller or gliding bearing being lubricated with a lubrication medium could be used here. The lubrication medium could be e.g. oil or grease. The slewing bearing must not be in contact with sea water.

The axis of rotation Y-Y of the propulsion unit 20 may be vertical or deviate to some extent from the vertical plane. The angle between the axis of rotation Y-Y of the propulsion unit 20 and the shaft line X-X may be 90 degrees or deviate to some extent from 90 degrees.

The support structure between the slewing bearing 300 and the second inner bottom 12 is in the embodiments shown in FIGS. 2 to 8 realized for example with radially and vertically Y-Y extending flanges 87. The support structure could instead by realized with bushings extending between the slewing bearing 300 and the second inner bottom 12. The support structure could also be realized with an annular support structure extending between the slewing bearing 300 and the second inner bottom 12. The annular support structure would include several support segments forming a ring.

The invention and its embodiments are not limited to the examples described above but may vary within the scope of the claims.

Thus, It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A cooling arrangement configured for a propulsion unit, which propulsion unit includes a hollow strut having an upper portion and a lower portion, an upper end portion of the upper portion passing through a passage (P1) formed between a first outer bottom and a second inner bottom in a vessel, the upper end portion being rotatable around an axis (Y-Y) of rotation, supported at a hull of the vessel with a slewing bearing, and sealed against the hull of the vessel with a slewing seal positioned under the slewing bearing, a motor being positioned in the lower portion of the strut, the cooling arrangement comprising:
   a cooling air duct system configured for directing cooling air (L1) to an interior of a strut and for directing return air (L2), which has been heated in a motor back from the interior of the strut;
   at least one fan for circulating the cooling air (L1);
   at least one cooling unit for cooling the return air (L2);
   a slewing seal having an upper slewing seal and a lower slewing seal positioned at a vertical distance (H1) from each other, whereby a space is formed between the upper slewing seal and the lower slewing seal;
   an upper end portion of an upper end of a strut wherein openings (O1) pass through a side wall of the upper end portion along a circumference of the side wall of the upper end portion in the space between the upper slewing seal and the lower slewing seal; and
   a first cooling air duct of the cooling air duct system which is directed to the space between the upper slewing seal and the lower slewing seal for circulating cooling air (L1) through the first cooling air duct into the space between the upper slewing seal and the lower slewing seal, and through the openings (O1) in the upper end portion to an interior of the strut, or for circulating return air (L2) from the strut in an opposite direction.

2. The cooling arrangement according to claim 1, comprising:
   a second cooling air duct directed to a third cooling air duct at a point above the upper end of the upper end portion, said third cooling air duct passing from a motor through the strut to a point above the upper end of the upper end portion, for circulating return air (L2) from the strut through the second cooling air duct, or for circulating cooling air (L1) into the strut in an opposite direction.

3. The cooling arrangement according to claim 1, wherein the first cooling air duct comprises:
   an annular portion surrounding the space between the upper slewing seal and the lower slewing seal.

4. The cooling arrangement according to claim 1 in combination with a propulsion unit which comprises:
   the hollow strut having an upper portion and a lower portion, an upper end portion of the upper portion passing through a passage (P1) formed between a first outer bottom and a second inner bottom in a vessel, the upper end portion being rotatable around an axis (Y-Y) of rotation, supported at a hull of the vessel with a slewing bearing, and sealed against the hull of the vessel with the slewing seal positioned under the slewing bearing, wherein the upper slewing seal and the lower slewing seal are positioned at or above the second inner bottom of the vessel.

5. The cooling arrangement and propulsion unit combination according to claim 4, comprising:
   a motor positioned in the lower portion of the strut, the slewing bearing being supported on the second inner bottom of the vessel with a support structure extending between the slewing bearing and the second inner bottom of the vessel.

6. The cooling arrangement and propulsion unit combination according to claim 5, wherein the support structure comprises:

radially and vertically (Y-Y) extending support flanges extending between the slewing bearing and the second inner bottom of the vessel.

7. The cooling arrangement and propulsion unit combination according to claim 5, wherein the support structure comprises:
vertically (Y-Y) extending bushings between the slewing bearing and the second inner bottom of the vessel.

8. The cooling arrangement and propulsion unit combination according to claim 5, wherein the first cooling air duct comprises:
an annular portion surrounding the space between the upper slewing seal and the lower slewing seal, said annular portion being positioned within an inner circumference of the support structure and at least one radial portion positioned in the space between the support structures and leading from the fan and the cooling unit to the annular portion.

9. The cooling arrangement and propulsion unit combination according to claim 5, wherein the first cooling air duct comprises:
an annular portion surrounding an outer circumference of the support structure and at least one radial portion leading from the fan and the cooling unit to the annular portion.

10. The cooling arrangement according to claim 1 in combination with a propulsion unit which comprises:
the hollow strut having an upper portion and a lower portion, an upper end portion of the upper portion passing through a passage (P1) formed between a first outer bottom and a second inner bottom in a vessel, the upper end portion being rotatable around an axis (Y-Y) of rotation, supported at a hull of the vessel with a slewing bearing, and sealed against the hull of the vessel with the slewing seal positioned under the slewing bearing, wherein the upper slewing seal and the lower slewing seal are positioned under the second inner bottom of the vessel in the space between the first outer bottom and the second inner bottom of the vessel.

11. The cooling arrangement and propulsion unit combination according to claim 10, wherein the first cooling air duct is arranged to pass through an opening in the second inner bottom and in the space between the first outer bottom and the second inner bottom of the vessel to an annular portion of the first cooling air duct surrounding the space between the upper slewing seal and the lower slewing seal for circulating cooling air (L1) through the cooling air duct to the annular portion and through the openings (O1) in the upper end portion to the interior of the strut, or for circulating return air (L2) from the strut in the opposite direction.

12. The cooling arrangement and propulsion unit combination according to claim 11, wherein the slewing bearing comprises:
a first bearing block supported directly or indirectly on the second inner bottom of the vessel, and a second bearing block supported on the upper end portion of the upper portion of the strut or vice versa; and
roller or gliding means between the first bearing block and the second bearing block so that the first bearing block and the second bearing block are rotatable in relation to each other.

13. The cooling arrangement and propulsion unit combination according to claim 12, wherein the vertical distance (H1) is at least 100 mm.

14. The cooling arrangement and propulsion unit combination according to claim 12, wherein the vertical distance (H1) is at least 200 mm.

15. The cooling arrangement and propulsion unit combination according to claim 12, wherein the vertical distance (H1) is at least 300 mm.

16. The cooling arrangement in combination with a propulsion unit according to claim 4, comprising:
a second cooling air duct directed to a third cooling air duct at a point above the upper end of the upper end portion, said third cooling air duct passing from a motor through the strut to a point above the upper end of the upper end portion, for circulating return air (L2) from the strut through the second cooling air duct, or for circulation cooling air (L1) into the strut in an opposite direction.

17. The cooling arrangement in combination with a propulsion unit according to claim 16, wherein the first cooling air duct comprises:
an annular portion surrounding the space between the upper slewing seal and the lower slewing seal.

* * * * *